Figure 1:
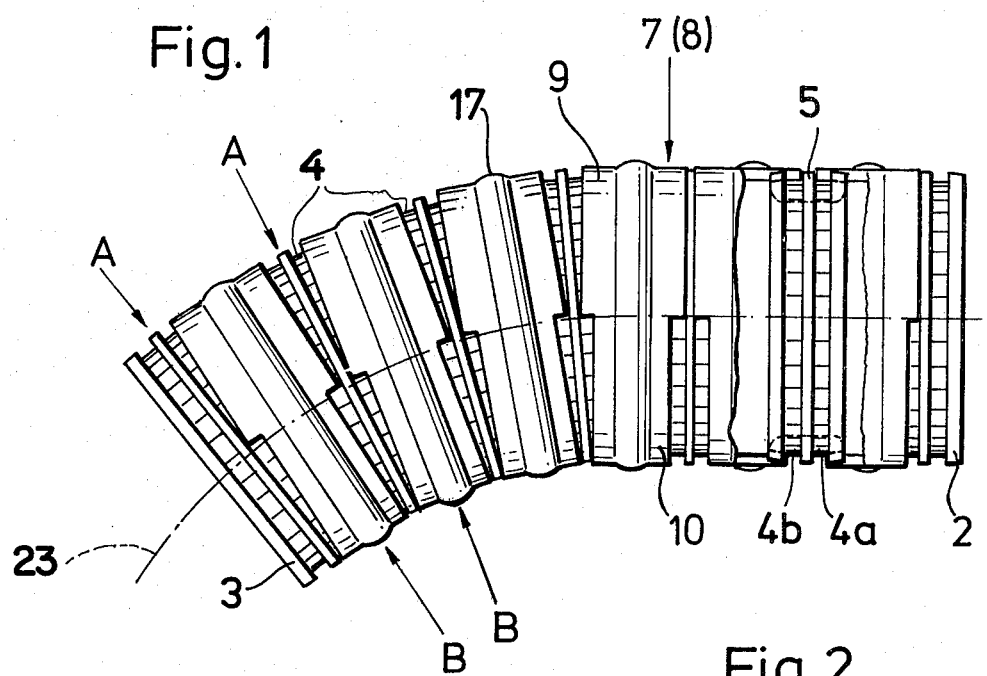

United States Patent [19]

Moritz et al.

[11] 4,228,825
[45] Oct. 21, 1980

[54] TRANSMISSION LINE CARRIER

[75] Inventors: Werner Moritz, Siegen; Kurt Loos, Netphen; Friedrich Haschek, Siegen, all of Fed. Rep. of Germany

[73] Assignee: Kabelschlepp Gesellschaft mit beschränkter Haftung, Siegen, Fed. Rep. of Germany

[21] Appl. No.: 2,194

[22] Filed: Jan. 9, 1979

[30] Foreign Application Priority Data

Feb. 11, 1978 [DE] Fed. Rep. of Germany ....... 2805832

[51] Int. Cl.³ .............................................. F16L 11/18
[52] U.S. Cl. ................................. 138/120; 191/12 C; 285/163
[58] Field of Search .............. 138/120, 121, 155, 108, 138/162, 163; 285/163, 164; 59/78.1; 191/12 R, 12 C

[56] References Cited

U.S. PATENT DOCUMENTS

| | | | |
|---|---|---|---|
| 263,627 | 8/1882 | Thayer | 138/108 |
| 456,376 | 7/1891 | Delafor | 138/108 |
| 842,580 | 1/1907 | Plecker | 138/162 X |
| 937,876 | 10/1909 | Sicklesteel et al. | 138/162 |
| 1,255,577 | 2/1918 | Berry | 138/120 X |
| 2,643,680 | 6/1953 | Kaiser | 138/120 |
| 2,823,703 | 2/1958 | Nusser | 138/120 X |
| 2,975,807 | 3/1961 | Waninger | 138/120 X |
| 3,060,972 | 10/1962 | Sheldon | 138/120 |
| 3,330,105 | 7/1967 | Weber | 138/120 X |
| 4,111,236 | 9/1978 | Moritz | 138/120 |

FOREIGN PATENT DOCUMENTS 1009297  11/1965  United Kingdom ..................... 138/162

*Primary Examiner*—Richard E. Aegerter
*Assistant Examiner*—James E. Bryant, III
*Attorney, Agent, or Firm*—Martin A. Farber

[57] ABSTRACT

A transmission line carrier for the arrangement between a moveable consumer and a stationary connection comprising a row of tubular members which can be angled with respect to one another and engage in one another, including an alternating arrangement of wide tubular members with inwardly directly abutments and narrow tubular members with outwardly directed abutments. Each wide tubular member is shorter in the vicinity of a cross-section half thereof approximately by the width of a channel, which channel is arranged between the abutments of each narrow tubular member.

23 Claims, 16 Drawing Figures

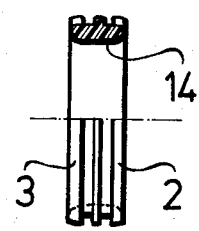
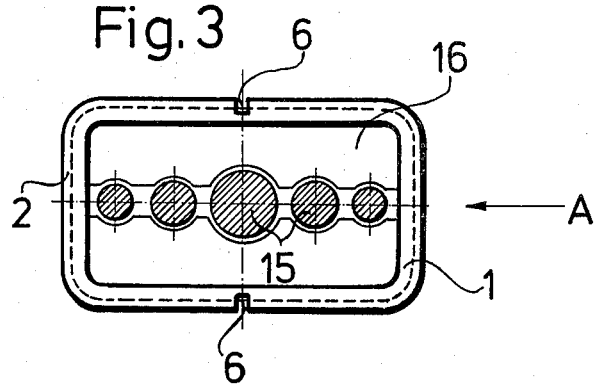
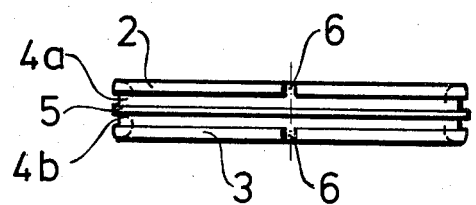
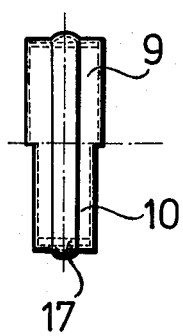
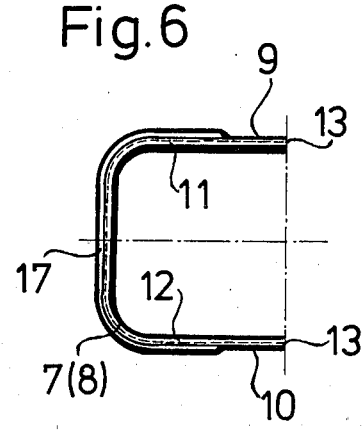
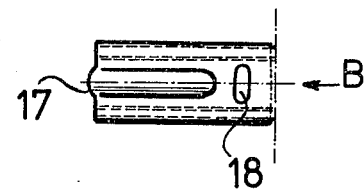
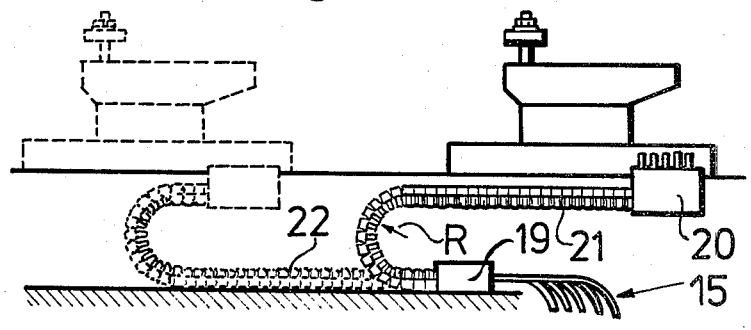

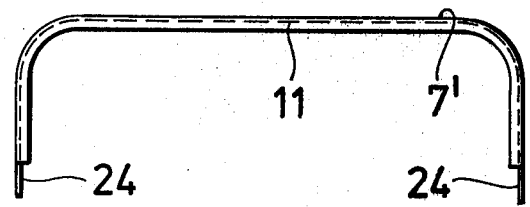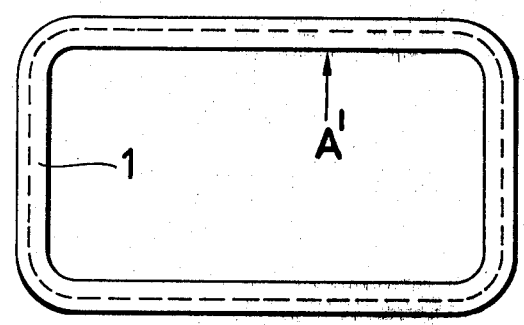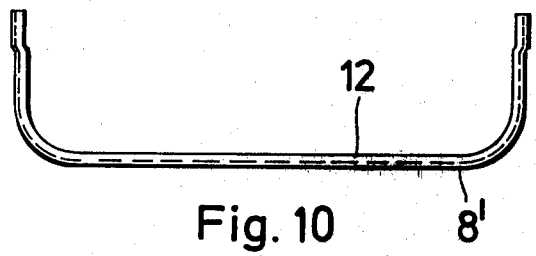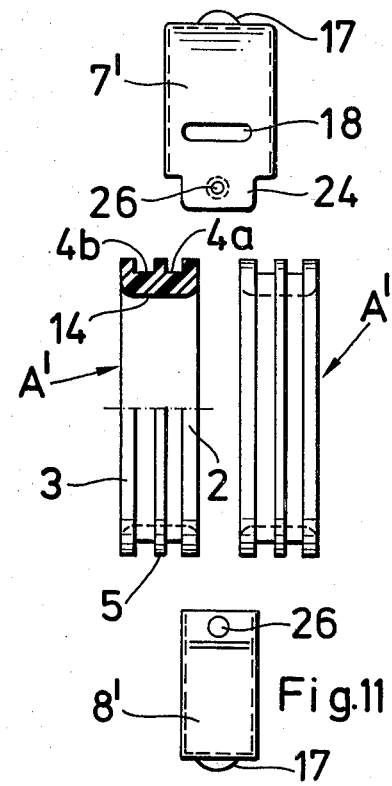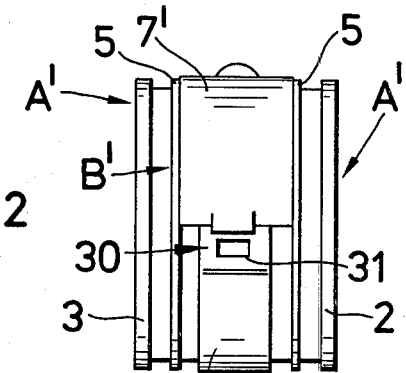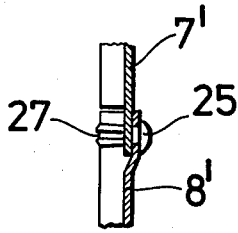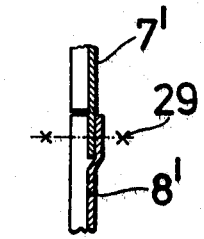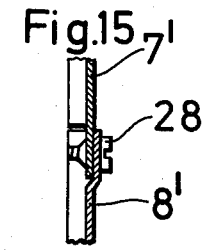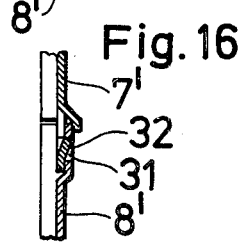

TRANSMISSION LINE CARRIER

The invention starts out from a transmission line carrier for the arrangment between a moveable consumer and a stationary connection comprising a row of tubular members which can be angled-off with respect to one another and engage in one another, whereby wide tubular members with inwardly directly abutments and narrow tubular members with outwardly directed abutments are alternately arranged.

An articulated tube is known which is also usable as a reinforcement sheath for wires, lines, tubing, etc., and which comprises short tubular pieces which are held together by alternating inward- and outward-flanging of their edges (German Pat. No. 817 543). This articulated pipe comprises individual, short tubular pieces made of a wide part with an inwardly flanged-around edge and a narrow part, the edge of the latter having an outward flange. Assembling the tubular pieces together takes place in the manner that the narrow part of a tubular piece engages in the wider part of the following tubular piece. With this known articulated tube which can be interpreted in an additional sense also as a "transmission line carrier", the tubular pieces can be angled-off in every direction with respect to one another, i.e. the articulated tube can be bent as a hose spacially in three coordinates. This known articulated tube is able to be used only limitedly as a transmission line carrier for the arrangement between a moveable consumer and a stationary connection since it is not self-supportingly formed.

With an additionally known transmission line carrier which consists of a row of tubular members which are pivotally connected to one another, the tubular members in alternating succession are inserted in one another with larger and smaller transverse dimensions in the range of their ends and are connected with one another by means of hinge pins or bolts (German Auslegeschrift AS No. 1 449 670). The abutments for limiting the bending or angling-off of the tubular members relative to one another are formed by the inner- and outer- walls, respectively, of the tubular members which are assembled in one another. This known transmission line carrier has the disadvantage that the different tubular members must be connected to one another with special hinge bolts or pins. Consequently it is not possible, or yet only possible with great difficulty, to manufacture the tubular members on an automatic assembly line and to assemble the tubular members to each other by means of the hinge bolts.

Finally devices are also known for the guiding of flexible cables or tubes from one fixed terminal or connection position to a moveable consumer by means of a flexible metal tube (German Offenlegeschrift OS No. 2 341 849). In order from the metal tube to make a self-supporting transmission line carrier, it is necessary to fix the edges of the respective adjoining turns or windings which engage in one another, against one another with a spring steel band along an axis with respect to their spacing in the telescoped condition or also in the condition pulled out from one another. Accordingly the metal tube which is fixed in the telescoped condition can still be bent only in the direction toward the spring steel band, while it is self-supporting in the other direction, since the individual windings can no longer open on the side of the spring steel band and in this manner support themselves against one another on the remaining perphery of the metal tube. It is reversed with the metal tube fixed with the spring steel band in the condition pulled out from one another. The use of a metal tube as a transmission line carrier has the disadvantage that itself it is not self-supporting but rather must be made self-supporting by additional devices, for example, the spring steel band to be connected with each winding must be made self-supporting. A further disadvantage resides in that the metal tube on all sides is almost tightly closed and is not ventilated inside so that a heat barrier can develop with the result that the laid or placed transmission lines become damaged. Additionally, the metal tube which is formed as a self-supporting transmission line carrier has the disadvantage that the neutral zone lies in the plane of the spring steel band, the latter which is connected with the windings, so that the transmission lines can be damaged on the inside by the opening and closing windings of the metal tube.

Starting from this, the invention is based on the task to produce a transmission line carrier which is assembled or put together from tubular members, which is self-supporting, every type of danger of squeezing and clamping toward the inside and outside is avoided and its tubular members can be produced and assembled fully automatically without great cost from a thin metal sheet and/or plastic synthetic material.

For solution of this task a transmission line carrier of in introductory described type is proposed by which each wide tubular member is shortened in the vicinity of a cross-section half approximately by the width of a channel, which channel is arranged between the abutments of a narrow tubular member. Thereby each wide tubular member can comprise two tubular member halves with U-shaped cross-sectional form, the tubular member halves being able to be pushed on the narrow tubular members.

With a first practical embodiment, each tubular member half in the range of a cross-section half can be constructed shorter, whereby the connection between the two tubular member halves lies in a center plane which extends perpendicularly to the neutral zone. On their points of abutment the two tubular member halves can overlap and can be connected with one another, for example, by means of a spot weld. It is yet also possible to provide the ends of the tubular member halves of the wide tubular members with inwardly directed projections which engage in corresponding grooves, the latter being arranged in the abutments of the narrow tubular members. With this special formation the two tubular member halves of the wide tubular members can be pushed on the narrow tubular members from the outside, whereby in their end position they snap-in with the projections in the grooves of the narrow tubular members. This first embodiment already can be produced and assembled completely automatically.

With a second practical embodiment one of the two tubular member halves of each wide tubular member can be shorter by the width of the channel, which channel is arranged between the abutments of each narrow tubular member, whereby the connection between the two tubular member halves lies in the area of the neutral zone of the tubular members. On their points of abutment, with this embodiment the tubular member halves can also overlap, whereby the wider tubular member halves engage with set-offs in the narrower tubular member halves. Each connection between the two tubular member halves can comprise a spot weld, a spreading or expansion rivet or even a screw. Preferably even still with this embodiment the connection is formed as a snap-connection, whereby the ends of the narrower tubular member halves each have a window in which there catches a resilient tongue as a grapple hook, the tongue being stamped or punched-out from the set-off of the wider tubular member half. Even this second embodiment can be produced and assembled completely automatically.

In a further formation of the invention it is possible to arrange an abutment ring in the middle plane of the narrow tubular members, which ring partitions the channel which is arranged between the abutments into two partial channels. With this design the radius of curvature can be changed by a widening of the abutments and/or of the abutment ring on the narrow tubular members, while the wide tubular members and their tubular member halves, respectively, retain their design.

The wide tubular members and their tubular member halves, respectively, are suitably punched and stamped from a thin sheet metal, while the narrow tubular members are produced from an insulating material, preferably synthetic material. This selection of material for the wide and narrow tubular members has the advantage that the transmission line carrier withstands even strong mechanical stresses on the outside, while the narrow tubular members which are produced of synthetic material form a protecting support for the transmission lines which are laid or placed in the interior space and prevent damage to the lines.

A transmission line carrier which is formed in accordance with the invention has the advantage that it is self-supporting, i.e. the tubular-shaped members which are connected with one another can be angled-off with respect to one another only in one direction from the extended position, while in the other direction as a consequence of the abutments which engage or grip behind one another they form a rigid tubular-shaped body, with which body the distance between a moveable consumer and the curved part which leads to a stationary connection can be bridged-over or spanned unsupported. Moreover the transmission line carrier in the combined embodiment with divided, wide tubular members made of sheet metal and made of plastic material—injection molded narrow tubular members has the advantage that the individual parts can be produced and assembled with one another completely mechanically. A further advantage is that the neutral zone lies approximately in the middle plane so that the relative movement of the individual tubular members to the transmission lines which are contained therein is very small. Moreover care is taken that the transmission lines can be supported on the smoothly formed inner side of the narrow tubular members. If the narrower tubular members in a preferred embodiment additionally are provided with inwardly projecting supports for the transmission lines, it is indeed possible to raise the transmission lines to the neutral zone and to avoid any relative movement between the transmission lines and their supports.

Figure 2:
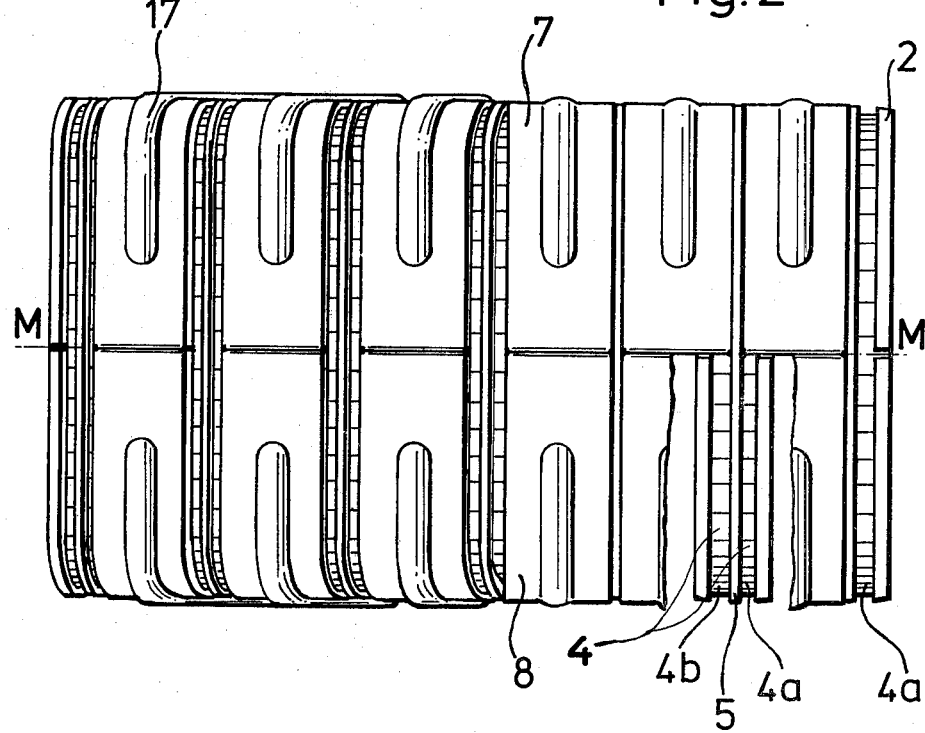

The invention is closely explained in the following description on the basis of two preferred embodiments of a transmission line carrier constructed in accordance with the invention with reference to the drawings. The drawings show:

FIG. 1 some tubular members, connected with one another, of a first embodiment of a transmission line carrier in side view;

FIG. 2 the same tubular members in top plan view;

FIG. 3 a narrow tubular member in the base plan view;

FIG. 4 the same narrow tubular member in top plan view;

FIG. 5 the same narrow tubular member in side view;

FIG. 6 a tubular member half of a wide tubular member in base plan view;

FIG. 7 the same tubular member half in top plan view;

FIG. 8 the same tubular member half in side view;

FIG. 9 is a functional schematic view for a self-supporting transmission line carrier with a moveable consumer and a stationary connection;

FIG. 10 an exploded view of two narrow tubular members and a still separated wide tubular member of a second embodiment, in base plan view;

FIG. 11 the same exploded view according to FIG. 10, in side view;

FIG. 12 two narrow tubular members which are connected with one another by means of a wide tubular member, in side view;

FIG. 13 a connection with an expansion rivet in cross-section;

FIG. 14 a connection by means of a spot weld in cross-section;

FIG. 15 a screw connection in cross-section;

FIG. 16 a snap-connection in cross-section.

A transmission line carrier formed according to the invention comprises an alternating series of narrow tubular members A and wide tubular members B, which are positively locked together by shape and from the extended postion can be pivoted with respect to one another only to one side, while in the extended position at the other three sides they form a rigid tubular track.

In the embodiment illustrated in FIGS. 3 to 5 each narrow tubular member A comprises a ring 1 with a rectangular cross-section, which ring forms a channel 4 at the outer periphery. The channel 4 is limited by abutments 2, 3. By an abutment ring 5 which is arranged in the middle plane the channel 4 is partitioned into two partial channels 4a and 4b. On the upper- and lower-side, grooves 6 are admitted in the abutments 2 and 3 in the middle.

In the embodiment illustrated in FIGS. 6 to 8 each wide tubular member B comprises two tubular member halves with a U-shaped cross-section, the points of abutment of which lie in the vicinity of a center plane M which extends perpendicularly or vertically to the neutral zone. Each tubular member half 7 or 8 comprises a wide upper part 9 and a somewhat narrower lower part 10. The shortening of the lower part 10 compared to the upper part 9 corresponds to the width of the channel 4 on the narrow tubular member A. In the illustrated embodiment the lower part 10 jumps inwardly on each side by the width of a partial channel 4a and 4b. On both sides of the upper part 9 and of the lower part 10, the tubular member halves 7 and 8 have inwardly directed abutments 11 and 12 which engage in the partial channels 4a and 4b on the narrow tubular member A. On the ends of the legs of each upper part 9 and lower part 10 of each tubular member half 7 or 8 there is arranged an inwardly directed nose or projection 13 which engages in the grooves 6 in the abutments 2 and 3 of the narrow tubular member A.

An energy conducting chain constructed in accordance with the invention comprising the narrow tubular members A and the wide tubular members B can be mounted or assembled by a simple slipping-on of the tubular member halves 7 and 8 of the wide tubular members B on the ring 1 of the narrow tubular member A. In this manner the abutments 2, 3 and 11, 12, respectively, engage behind one another and the projections 13 snap into the grooves 6, so that the ends of the legs of the two tubular member halves 7 and 8 abut or join together and form the closed wide tubular member B. This assembling and under circumstances if necessary even the disassembling of the transmission line carrier can be done without tools. Moreover it is possible to mechanize the assembling as well as the disassembling.

The narrow tubular members A preferably are made of an insulation material, particular synthetic material or plastic, so that on their inner side they form a smooth and protective support for the transmission lines 15. It is yet even possible to form or attach inwardly projecting holders 16 for the transmission lines 15 on the ring 1 of each narrow tubular member A in order to secure the transmission lines in the middle plane which is neutral with a swinging movement.

The wide tubular members B are suitably punched and stamped out of a thin sheet metal. In this manner it is possible to stamp or impress outwardly projecting beads or ridges 17 in the center of the tubular member halves 7 or 8, which ridges on the one hand increase the inherent stability and on the other hand serve as a support for the transmission line carrier with the use according to authorization or specification. Furthermore it is possible to punch openings 18 in the legs of the tubular member halves 7 or 8, for ventilation of the inner space, so that no heat barrier can form.

A transmission line carrier constructed and put together according to the previously set forth directions is determined for the purpose of being used between a stationary connection terminal 19 and a moveable consumer 20, for example the carriage of a tool machine, in order to carefully or protectively guide transmission lines 15 relieved of tension, for example, cable- and tubing for electricity, compressed air and/or cooling means. Thereby the transmission line carrier must be self-supporting in the upper strand 21 of the chain, so that it does not sag and the transmission lines 15 buckle. Toward the lower strand 22 of the chain, the transmission line carrier can only be bent about a radius R which corresponds to the allowable bending radius of the most sensitive transmission line 15. These conditions for a self-supporting construction of the transmission carrier, the maintenance of a certain radius of curvature as well as the protective and untensioned guiding of the transmission lines 15 are fulfilled by the design of the narrow tubular members A and the wide tubular members B.

With a further embodiment illustrated in the FIGS. 10 and 11 each narrow tubular member A' comprises the ring 1 with a rectangular base plan view, which ring on the outer periphery forms the channel 4 which is limited by the abutments 2, 3, which channel is subdivided into the two partial channels 4a and 4b by the abutment ring 5 which is arranged in the middle plane. With this embodiment of the tubular member A' only the grooves 6 are absent.

With this second embodiment illustrated in FIGS. 10 to 12 each wide tubular member B' comprises two tubular member halves 7' and 8' with a U-shaped base plan view and likewise a U-shaped cross-sectional shape. The outer tubular member half 7' is formed wider than the inner tubular member half 8' by the amount of the two partial grooves 4a and 4b on the narrow tubular member A'. In this manner the lower tubular member half 8' jumps inwardly in the vicinity of a neutral zone 23 on each side by the width of a partial channel 4a or 4b. The tubular member halves 7' and 8' on their two sides have inwardly directed abutments 11 and 12 which engage in the partial channels 4a and 4b on the narrow tubular members A'.

The two tubular member halves 7' overlap in the range of the neutral zone 23 on their points of abutment. For this purpose on the outer tubular member half 7' there is provided a set-off or tab 24 which is overlapped by the ends of the legs of an inner tubular member half 8'.

The connection between two tubular member halves 7' and 8' can comprise an expansion rivet 25 according to FIG. 13, which is pushed in the bores 26 which are flush in alignment with one another in the overlapping range and its shank is expanded with a core pin 27. In the embodiment according to FIG. 15 it is even possible to tap a screw thread or turn a screw 28 in the two bores 26.

According to FIG. 14 the connection between the two tubular member halves 7' and 8' yet even comprises a spot weld 29.

Finally it is also possible according to FIGS. 12 and 16 to produce a snap connection 30 which comprises a window 31 (which window is punched out of the ends of the legs of the inner tubular member half 8') and a resilient springing tongue 32 which is punched in the set-off 24 of the outer tubular member half 7'. The tongue catches like a type of a barbed or grapple hook in the window 31.

The narrow tubular member A' of this embodiment preferably also is made of an insulating material particularly synthetic material or plastic, while the wide tubular member B' likewise is suitably punched or stamped out of a thin sheet metal. The function of a transmission line carrier according to this second embodiment corresponds to that of the first embodiment as it has previously been described on the basis of FIG. 9.

We claim:

1. A self-supporting transmission line carrier between a moveable consumer and a stationary connection comprising a row of a plurality of two adjacent tubular members articulated only in one direction with respect to one another and engaged in one another including, wide tubular members each with inwardly directed abutments and narrow tubular members each with outwardly directed abutments alternatingly arranged slidably engaged in each other, said tubular members having a non-circular cross-section thereby being axially non-rotatable relative to each other, the narrow tubular members each forming a channel therearound by and between said outwardly directed abutments thereof, each of said wide tubular members is shortened on both sides thereof viewed in a longitudinal direction of the transmission line carrier in the vicinity of a longitudinal cross-section half of the transmission line carrier, a bottom end portion of each said wide tubular members relative to a top end portion of each said wide tubular members is shorter in said longitudinal direction approximately by the width of said channel in the longitudinal directions, each of said wide tubular members comprises two tubular member halves each with a U-shaped cross-sectional form, said tubular member halves are pushed together on said narrow tubular members with respect of said inwardly and outwardly directed abutments interengaging so as to be joined to form said transmission line carrier.

2. The transmission line carrier according to claim 1, wherein
each said tubular member half in the range of said cross-section half is formed shorter by the width of said channel,
means for connecting said two tubular member halves,
said connecting means lies in a center plane which extends perpendicularly to a neutral zone of said wide and narrow tubular members.

3. The transmission line carrier according to claim 1, wherein
said tubular member halves of said wide tubular members define legs with ends and have inwardly directed projections on the ends of said legs,
said outwardly directed abutments of said narrow tubular members are formed with grooves,
said projections engage in said grooves.

4. The transmission line carrier according to claim 1, wherein
one of said two tubular member halves of each said wide tubular member is shortened by the width of said channel relative to said other of said two tubular member halves,
means for connecting said two tubular member halves, said connecting means lies in the area of a neutral zone of said wide and narrow tubular members.

5. The transmission line carrier according to claim 4, wherein
said tubular member halves overlap in the vicinity of said connecting means,
the other of said two tubular member halves constitutes a wider tubular member half and is formed with set-offs,
said set-offs engage in said one tubular member half constituting a narrower tubular member half.

6. The transmission line carrier according to claim 4, wherein each said connecting means comprises an expansion rivet.

7. The transmission line carrier according to claim 4, wherein each said connecting means comprises a screw.

8. The transmission line carrier according to claim 4, wherein each said connecting means comprises a spot weld.

9. The transmission line carrier according to claim 5, wherein
said connecting means is formed as a snap-connection comprising,
ends of said narrower tubular member half, each said ends is formed with a window,
a resilient tongue constituting a grapple hook punched-out from said set-offs respectively of said wider tubular member half catches in said window.

10. The transmission line carrier according to claim 1, wherein said narrow tubular members are formed with an abutment means arranged in a middle plane thereof parallel to said outwardly directed abutments, said abutment means partitions said channel into two partial channels.

11. The transmission line carrier according to claim 1, wherein the radius of curvature of said wide and narrow members in combination is a variable function of the width of said outwardly directed abutments.

12. The transmission line carrier according to claim 10, wherein the radius of curvature of said wide and narrow tubular members in combination is a variable function of the width of said abutment means.

13. The transmission line carrier according to claim 12, wherein
the shortening of said each said wide tubular members on each of said both sides is equal to one of said partial channels respectively.

14. The transmission line carrier according to the claim 1, wherein said tubular member halves of said wide tubular members have outwardly projecting beads.

15. The transmission line carrier according to claim 1, further comprising inwardly projecting means for holding the transmission lines disposed in said narrow tubular members.

16. The transmission line carrier according to claim 1, wherein said tubular member halves of said wide tubular members are made of thin sheet metal and said narrow tubular members are made of insulating material.

17. The transmission line carrier according to claim 16, wherein said insulating material is plastic.

18. The transmission line carrier according to claim 1, wherein
both said narrow and said wide tubular members each have a symmetrical shape,
said narrow tubular members are each formed in one piece,
one of said two tubular member halves is a lower half and the other of said two tubular member halves is an upper half, said lower half and said upper half are symmetrically stepped, with said lower half being narrower in the longitudinal direction than said upper half.

19. The transmission line carrier according to claim 1, wherein
upper portions of successive of said two tubular member halves of said wide tubular members are disposed substantially adjacent each other at least at a topmost portion and at said cross-sectional half of the transmission line carrier.

20. The transmission line carrier according to claim 10, wherein
in all articulated positions of said tubular members, said wide tubular member has a width in the longitudinal direction adjacent said cross-sectional half equal to the spacing between said abutment means of two adjacent of said narrow tubular members whereby said cross-sectional half constitutes a neutral zone having the same longitudinal length in all articulated positions.

21. The transmission line carrier according to claim 20, wherein
said both sides of said upper portions are straight and parallel to each other in a horizontal position of said transmission line carrier, said both sides are vertically aligned and substantially contact adjacent of said sides of successive said tubular member halves.

22. The transmission line carrier according to claim 20, wherein
said cross-sectional half constitutes a neutral zone located approximately in a middle longitudinal plane through the transmission line carrier.

23. The transmission line carrier according to claim 20, wherein
said abutment means constitutes an outwardly directed abutment ring.

* * * * *